(12) United States Patent
Canches et al.

(10) Patent No.: US 10,673,738 B2
(45) Date of Patent: *Jun. 2, 2020

(54) COMPARISON BETWEEN DIFFERENT DESCRIPTIONS OF A WEB SERVICE

(71) Applicant: International Business Machines Corporation, Armonk, NY (US)

(72) Inventors: Julien Canches, Toulouse (FR); Omer Tripp, Bronx, NY (US); Emmanuel Wurth, Saubens (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

This patent is subject to a terminal disclaimer.

(21) Appl. No.: 15/811,791

(22) Filed: Nov. 14, 2017

(65) Prior Publication Data

US 2018/0069779 A1 Mar. 8, 2018

Related U.S. Application Data

(63) Continuation of application No. 14/280,895, filed on May 19, 2014, now Pat. No. 9,887,903.

(30) Foreign Application Priority Data

Jun. 4, 2013 (GB) .................................. 1309942.9

(51) Int. Cl.
*G06F 11/36* (2006.01)
*H04L 12/721* (2013.01)
*H04L 29/08* (2006.01)

(52) U.S. Cl.
CPC .............. *H04L 45/12* (2013.01); *H04L 67/02* (2013.01); *H04L 67/16* (2013.01)

(58) Field of Classification Search
CPC ................................ H04L 45/12; H04L 67/16
(Continued)

(56) References Cited

U.S. PATENT DOCUMENTS 8,504,008 B1 * 8/2013 Gossweiler, III ........................... H04M 1/72533
455/419
2007/0136236 A1 6/2007 Kussmaul et al.
(Continued)

OTHER PUBLICATIONS

List of IBM Patents or Patent Applications Treated as Related; (Appendix P), Filed Nov. 14, 2017; 2 pages.
(Continued)

*Primary Examiner* — Vivek Srivastava
*Assistant Examiner* — Sibte H Bukhari
(74) *Attorney, Agent, or Firm* — Cantor Colburn LLP; Maeve Carpenter (57) ABSTRACT

In one embodiment, a computer-implemented method for comparing first and second descriptions of a web service includes computing a distance between each type used as a parameter in the first description and each type used as a parameter in the second description. A distance is calculated between methods in each of two or more pairs of methods. Each pair includes a method in the first description and a method in the second description. The calculating is performed by comparing the parameters of the first set of methods and the second set of methods using the computed distances between types. To the calculated distance between each pair of methods is added the distance between the names of the compared methods and the distance between the returned types of the compared methods. For each method in the first description, the method in the second description with the lowest calculated distance is output.

14 Claims, 4 Drawing Sheets

(58) Field of Classification Search
USPC .......................................................... 709/241
See application file for complete search history.

(56) References Cited

U.S. PATENT DOCUMENTS

2009/0119158 A1    5/2009  Chen et al.
2014/0304505 A1*  10/2014  Dawson .............. G06F 21/6227
                                              713/165
2014/0359161 A1   12/2014  Canches et al.

OTHER PUBLICATIONS

Hao, Yanan et al., "Web Services Discovery Based on Schema Matching", 30th Australasian Computer Science Conference, 2007, Ballarat, Australia, Conferences in Research and Practice in Information Technology (CRPIT), vol. 62, Gillian Dobbie, Ed.; 7 pgs.

Intellectual Property Office, Search Report, Application No. GB1309942.9, dated Nov. 25, 2013, 4 pages.

Jiang, Juanjuan et al., "UML-level Analysis and Comparison of Web Service Descriptions", IEEE, Proceedings of the Ninth European Conference on Software Maintenance and Reengineering, Mar. 2005, Section 3, pp. 236-240.

Mlynkova, Irena "Similarity of XML schema definitions" In Proceedings of the eighth ACM symposium on Document engineering (DocEng '08); Sep. 16-19, 2008; pp. 187-190.

Yu, Jianjun et al., "A Kernal Based Structure Matching for Web Services Search", WWW 2007, May 8-12, 2007, Banff, Alberta, Canada, located at: http://wwwconference.org/www2007/posters/poster902.pdf), 2 pages.

* cited by examiner

|     | m'1 | m'2 | m'3 | m'4 | m'5 |
| --- | --- | --- | --- | --- | --- |
| m1  | 3.2 | 8.9 | 7.6 | 9.8 | 6.5 |
| m2  | 7.8 | 1.6 | 8.7 | 8.2 | 6.5 |
| m3  | 8.4 | 8.2 | 2.2 | 7.4 | 7.5 |
| m4  | 8.2 | 6.8 | 6.8 | 9.7 | 3.0 |

COMPARISON BETWEEN DIFFERENT DESCRIPTIONS OF A WEB SERVICE

PRIORITY

This application is a continuation of and claims priority from U.S. patent application Ser. No. 14/280,895, filed on May 19, 2014, entitled "COMPARISON BETWEEN DIFFERENT DESCRIPTIONS OF A WEB SERVICE," which in turn claims priority from the Great Britain patent application 1309942.9, filed on Jun. 4, 2013. The entire contents of both these applications are incorporated herein by reference.

BACKGROUND

The present invention relates generally to web services and, more particularly, to comparing two different descriptions of a web service.

Web services are a fundamental cornerstone of the web, providing online functionality for web applications as well as for other web services. As such, web services have become an important subject of functional testing, including security testing, type state checking, etc. An important challenge in testing web services is to ensure that existing tests, already created against a specific version of a web service, can be reused or easily maintained when the web service is updated to a newer version. The same challenge exists for the maintenance of applications based on the web service. Existing testing tools for web services propose several manual methods to deal with the change of the web service from version i to version i+1. This leads to many end user interactions in order to discover which methods and types have been changed in order to propose specific fixes for the existing artefacts.

SUMMARY

In one embodiment, a computer-implemented method for comparing descriptions of a web service includes computing a distance between each type used as a parameter in a first description of a web service and each type used as a parameter in a second description of a web service, where the first description includes a first set of methods, the second description includes a second set of methods, and each method includes one or more parameters. A distance is calculated between methods in each of two or more pairs of methods, where each pair of methods includes a method in the first description and a method in the second description, and where the calculating is performed by comparing the parameters of the first set of methods and the second set of methods using the computed distances between types. To the calculated distance between each pair of methods is added a measure of the distance between the names of the compared methods and a measure of the distance between the returned types of the compared methods. For each method in the first description, at least the method in the second description with the lowest calculated distance is output.

In another embodiment, a system for comparing descriptions of a web service includes a computer processor. The computer processor is configured to compute a distance between each type used as a parameter in a first description of a web service and each type used as a parameter in a second description of a web service, where the first description includes a first set of methods, the second description includes a second set of methods, and each method includes one or more parameters. The computer processor is further configured to calculate a distance between methods in each of two or more pairs of methods, where each pair of methods includes a method in the first description and a method in the second description, and where the calculating is performed by comparing the parameters of the first set of methods and the second set of methods using the computed distances between types. To the calculated distance between each pair of methods, the computer processor is configured to add a measure of the distance between the names of the compared methods and a measure of the distance between the returned types of the compared methods. For each method in the first description, at least the method in the second description with the lowest calculated distance is output.

In yet another embodiment, a computer program product for comparing descriptions of a web service includes a computer readable storage medium having program instructions embodied therewith. The program instructions are executable by a processor to cause the processor to perform a method. The method includes computing a distance between each type used as a parameter in a first description of a web service and each type used as a parameter in a second description of a web service, where the first description includes a first set of methods, the second description includes a second set of methods, and each method includes one or more parameters. Further according to the method, a distance is calculated between methods in each of two or more pairs of methods, where each pair of methods includes a method in the first description and a method in the second description, and where the calculating is performed by comparing the parameters of the first set of methods and the second set of methods using the computed distances between types. To the calculated distance between each pair of methods is added a measure of the distance between the names of the compared methods and a measure of the distance between the returned types of the compared methods. For each method in the first description, at least the method in the second description with the lowest calculated distance is output.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Some embodiments of the present disclosure will now be described, by way of example only, with reference to the following drawings, in which.

DETAILED DESCRIPTION

According to some embodiments of this disclosure, an identification system or method can identify which methods in a later version of a description of a web service most likely correspond to particular methods in an earlier version of the description of the web service. This may address the problem of updating existing applications or existing tests applications or application suites when a web service description changes from version i to version i+1, with a reduced quantity of end user operations. Based on the use of a distance between Extensible Markup Language (XML) Scheme Definition (XSD) types that compose the input and output parameters of a service method, the identification system and method may identify the updated method in the version i+1 of the description.

The distance between types may be represented as a numerical value, which reflects the difference between the types being compared. The paper "Similarity of XML Schema Definitions," by Irena Mlynkova, provides one methodology of how the distance between two different types can be represented as a numerical value.

According to some embodiments, the status of a service method may be identified as, for example, having been deleted (i.e., this method no longer exists) or updated (i.e., in terms of input/output and changes in the sub-types). Based on an embodiment, a service method may be projected into a set of vectors of parameters, and a distance may be measured between methods in the earlier description compared to the later description, thus obtaining the best method candidates in the later version. Based on a delta analysis of the updates to the XSD types and the existing test suites (e.g., existing instances of XML calls against the web service), the identification system may pick up values from previous artefacts that still make sense in the updated method call. As a result, an end user's work for the version i of the web service may be at least partially preserved and moved into the version i+1 of the web service.

In some embodiments, the activity of calculating a distance between each method in the first description and each method in the second description includes selecting the minimum value generated from a set of distance measurements that include all combinations of the parameters in the compared methods. The most accurate distance measurement, when comparing two methods, may be generated by capturing the lowest value from a set of all of the combinations of the distance measurements. For example, if methodA(a,b) is compared to methodB(x,y), then two possible combinations of parameters are possible: (1) distance (a,x)+distance(b,y), and (2) distance(a,y)+distance(b,x). The lower of these two values may be returned as the distance between methodA and methodB. If the methods have more than two parameters, then a higher quantity of possible combinations may exist, but the same methodology may apply, in that when considering all of the possible parameter combinations, the identification system may use only the lowest distance value that is returned.

The act of outputting, for each method in the earlier description, at least the method in the later description with the lowest calculated distance may include outputting, for each method in the earlier description, an ordered list of methods in the second description with the lowest calculated distances. The process may be designed to identify, for each method in the earlier description, the best match of a method in the later description. However, there is no reason that only one candidate (i.e., the best candidate) has to be returned. An ordered list may therefore be provided that orders the matching methods in the later description according to their respective distances from the method in the earlier description. This can allow a user to consider different options, and the user may decide that a different method from the later description is actually more likely to be the match for the method in the earlier description, than the method with the shortest distance.

In some embodiments, a calculated distance may include a measure of the distance between the names of the compared methods. Thus, calculating an overall distance between two methods may include generating a vector representation of the calculated distance based on a parameter comparison, generating a measure of the distance between the names of the compared methods, and generating a measure of the distance between the returned types of the compared methods. Vector representations can be used to accurately determine the overall distance score, taking into account the different characteristics of the methods. Such characteristics may include the parameters of the methods, the names of the methods, and the types returned by the methods. The identification system may calculate a Cartesian product of these three calculated distances.

Figure 1:
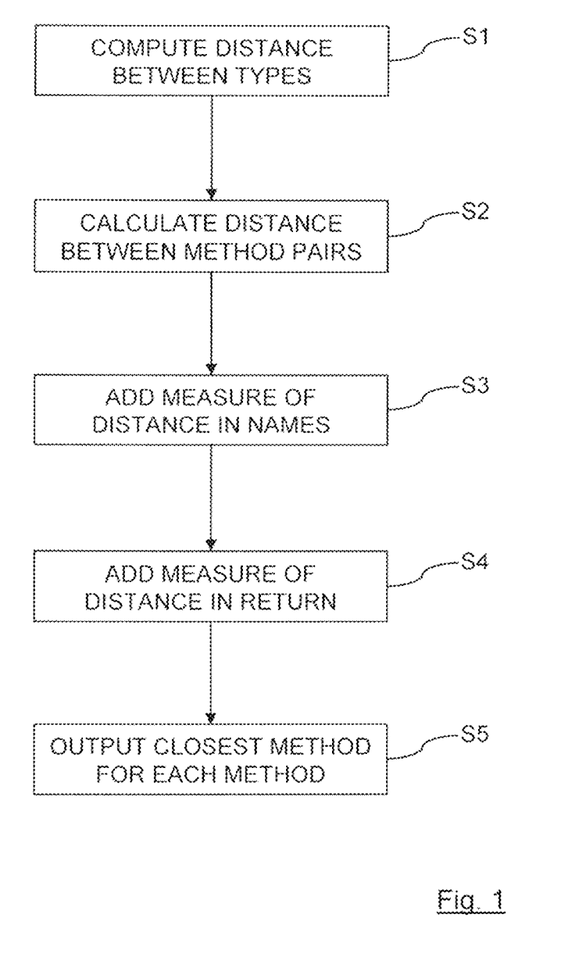
FIG. 1 is a flowchart of a process for comparing two different descriptions of a web service, according to an embodiment.

FIG. 1 shows a method for comparing two different descriptions of a web service, according to some embodiments of this disclosure, where each description includes a set of methods and each method includes one or more parameters. At block S1 of the method, a distance may be computed between each type used as a parameter in a first description (i.e., an earlier description) and each type used as a parameter in a second description (i.e., a later description). A numerical value may be obtained for each pair of types that are present in the parameters of the methods. For example, if the first description has methods referring to types X and Y and the second description has methods referring to types A and B, then four distances may be computed: (X,A) (X,B) (Y,A) and (Y,B).

Block S2 includes calculating a distance between each method in the first description and each method in the second description by comparing the parameters of the compared methods using the computed distances between types. This process will be described in more detail below, but essentially every method in the first description may be compared to every method in the second description, with a single distance measure being generated for each method pair. That single distance measure may be based on the computed values from block S1. So for example, if methodV1(type X) is compared to methodV2(type A, type B), then the outputted distance measure may be the lower of the two distance values, (X,A) and (X,B), generated in block S1.

Block S3 includes adding to each calculated distance a measure of the distance between the names of the compared methods. Then, at block S4, a measure of the distance between the returned types of the compared methods may be added to each calculated distance. Block S5 includes outputting, for each method in the first description, at least the method in the second description with the lowest calculated distance. In some embodiments, however, multiple methods of the second description may be returned, each with its corresponding calculated distance. In this way, for each method in the earlier description, the identification system may identify the most likely matching candidate(s) in the second description, which may be displayed to a user.

Figure 2:
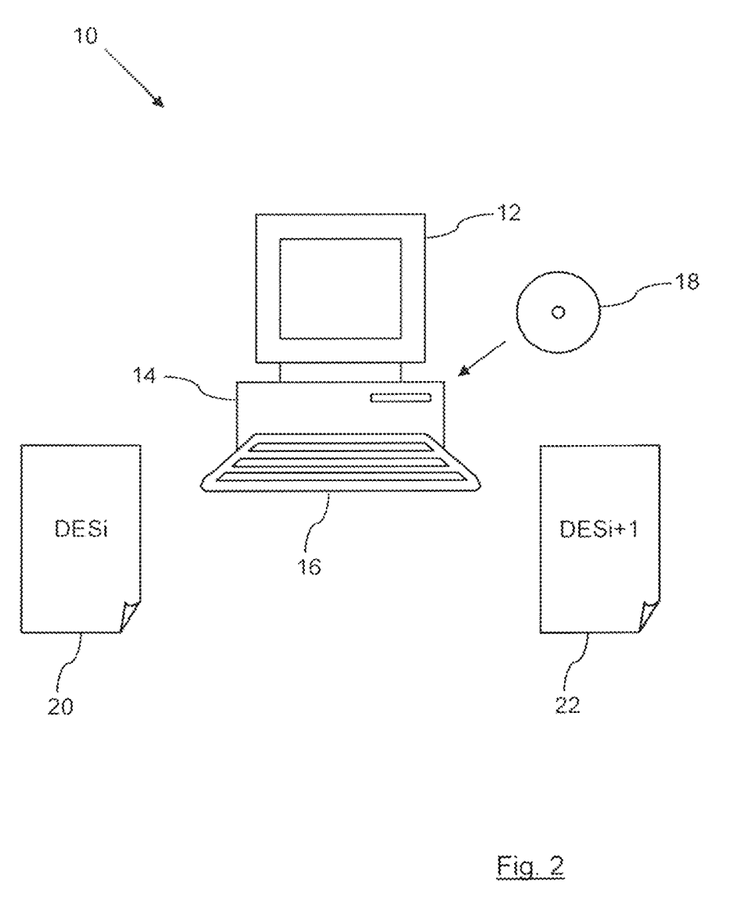
FIG. 2 is a schematic diagram of a computer and two descriptions of a web service, according to an embodiment.

FIG. 2 shows an example desktop computer 10 that includes a display device 12, a processor 14, and a user interface device 16. The processor 14 is controlled by a computer program product that is stored on a computer readable medium 18, which is a CD-ROM. The computer program product comprises instructions that are used to control the operation of the processor 14. The processor may be configured to compare two different descriptions 20 and 22 of a web service. The first description 20 is version i of the web service and the second description 22 is the version i+1 of the web service. The first description 20 is the earlier version of the web service and the second description 22 is the later (i.e., updated and changed) version of the web service.

Once a web service has been changed and the description of the web service has been changed accordingly, then applications that used the earlier web service and testing tools that were accurate for that web service are no longer safe to use and need to be adjusted to take into account the changes made in the new web service. The descriptions 20 and 22 may each include a set of methods, where each method includes one or more parameters. In order to facilitate the updating of application and testing tools, it is desirable to know which methods in the old description 20 correspond to which methods in the new description 22.

The processor 14 may be configured to identify those methods in the second description 22 that correspond to the methods in the first description 20. To this end, each method in the first description 20 may be compared to each method in the second description 22. A numerical distance value may be assigned to each method pair, and for each method in the first description 20, there may be a best candidate method in the second description 22 matching this method. The user may be presented with a display that shows the numerical matches, either showing just the best match or by showing an ordered list of candidates, for each method in the earlier version of the description 20, which can be used to select the appropriate matching method.

In the context of a web service description file standard, such as Web Service Definition Language (WSDL), the input to the processor 14 may be a WSDL file Wi and a WSDL file Wi+1. The output may be a mapping from each web service method in WSDL Wi to the most appropriate method in WSDL Wi+1. For all of the XSD types in Wi and Wi+1, the identification system may measure a distance for each type in Wi compared to each type in Wi+1.

For each method m in Wi compared to each method m' in Wi+1, the identification system may execute the Cartesian product between an mWi vector and all the coordinate permutations of an m'Wi+1 vector. The vectors may be aligned in terms of dimensions, and where extra dimensions exist on either side (mWi or m'Wi+1), a 0 may be placed. The vector mWi may have coordinates which are 1 or 0. For instance, a coordinate may be 1 if a type exist at this place, or 0 if dimensions have been added. Vector m'Wi+1 may have coordinates that are the distance between its own type and the initial type in m, parameter by parameter in a one-to-one correspondence. For all the permutation of the parameters into the method m' in Wi+1, the identification system may compute the Cartesian product in order to locate the arrangement that has the minimum value.

Figure 3:
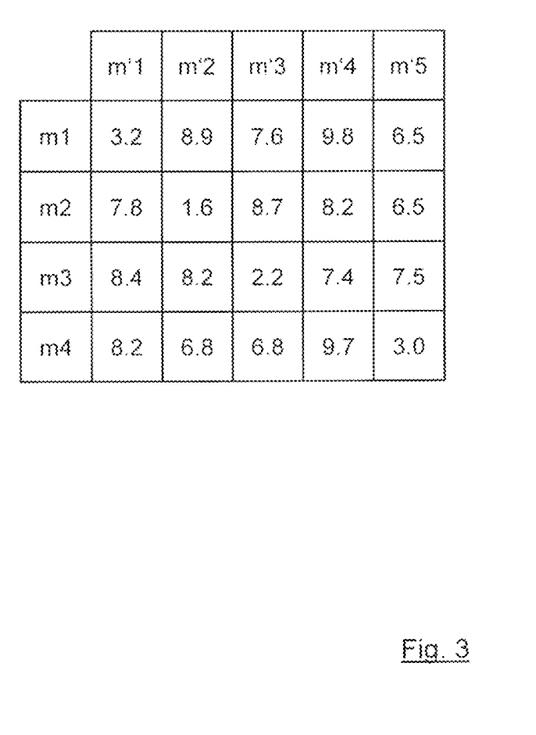
FIG. 3 is a table showing distance measurements for comparisons of methods in two descriptions of a web service, according to an embodiment.

By selecting the results that minimize the product and then using the distance between the names of the methods and of the type of the output in Wi compared to the type of the outputs in Wi+1 to re-filter the results, the final result may be proposed to the end user to select the correct matching method as required. FIG. 3 shows an example of how methods m1 to m4 of a first description of a web service are compared to methods M'1 to m'5 of a second description of the web service. The table lists the distance values generated from the various different method pair comparisons. In each row of the table, the lowest distance value may indicate the method in the second description that matches most closely to the method in the first description.

The comparison of the names of the methods may be helpful to provide a notion of semantic similarity between different methods. This comparison may be performed using a Levenstein distance, which is a common algorithm used to measure the distance between strings. For example, three different methods as follows: method1 status=recover_account_status(x,y,z), method2 status=update_account(x,y,z), and method3 status=update_enduser_account(x,y,z) can be compared using the Levenstein distance, which will provide the following output: d(m1,m2)=13, d(m1,m3)=18 and d(m2,m3)=8. From this result, the identification system may determine that methods 2 and 3 are close, whereas method 1 is not close to either of the other two methods.

Figure 4:
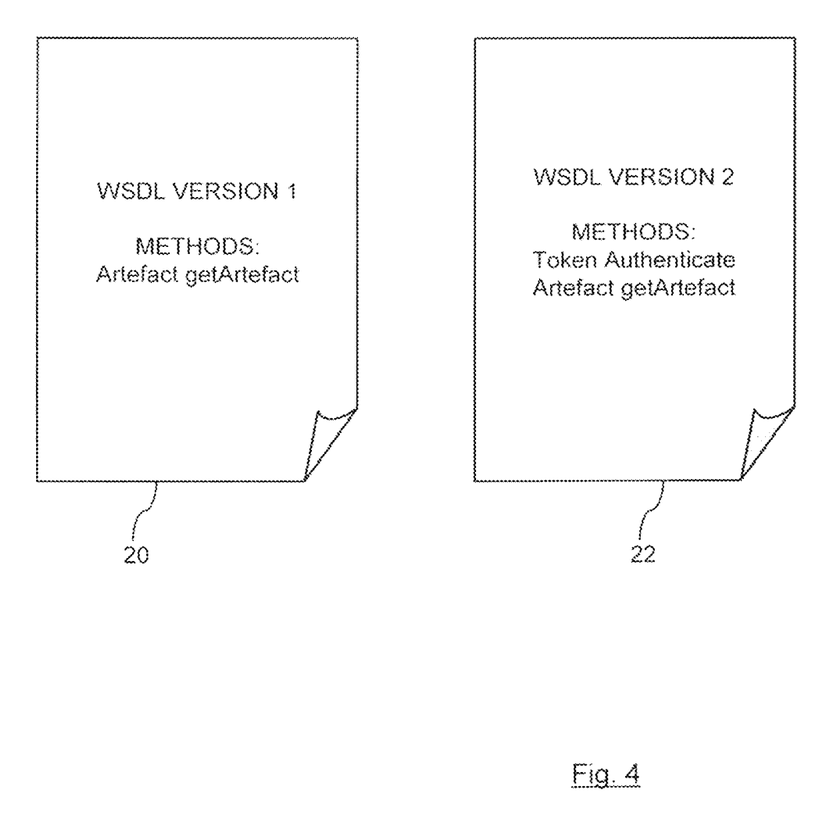
FIG. 4 is a schematic diagram of two different descriptions of a web service, according to an embodiment.

FIG. 4 illustrates an example relating to a web service with one method in a version 1, and two methods in a version 2. In the WSDL version 1, the method is Artefact getArtefact(Authentication, Param1, Param2), and in WSDL version 2, the methods are Token Authenticate(Authentication) and Artefact getArtefact(Param1, Param2, Token), as shown in the figure. In this example, it is assumed that the types Authentication, Param1, and Param2 are the same and that the distance between the types are D(Artefact and Token type)=10; D(Authentication and Token)=11;D(Authentication and Param1)=12; and D(Authentication and Param2)=13. It is assumed also that the distance between the name Authenticate and getArtefact is 9, calculated using the Levenstein distance.

The processor 14 may calculate the distance between Artefact getArtefact(Authentication, Param1, Param2) from version 1 of the web service description with Token Authenticate(Authentication) from version 2. To that end, the processor 14 may look at the parameters in the two methods being compared. This distance from the parameters point of view may be the minimum of Distance (Authentication, Authentication)=0, Distance (Authentication, Param1)=12, and Distance (Authentication, Param2)=13, with all of the permutation of the types having been considered. In this example, the result is 0. The processor 14 may then add the name distance so that 0+Distance(Name authenticate, Name getArtefact)=9. Then the processor 14 may add the distance related to the returned type 0+9+Distance (Artefact, Token)=0+9+10, and the final result is therefore Distance (Method getArtefact(V1), Method Authenticate(V2))=19.

The processor 14 may follow the same process to calculate the distance between Artefact getArtefact(Authentication, Param1, Param2) from version 1 with Artefact getArtefact(Param1, Param2, Token) from version 2. The processor 14 may examine the parameters of the methods being compared and the distance from the parameter point of view, and may identify the minimum of:

D(Authentication, Param1)+D(Param1,Param2)+D (Param2,Token);

D(Authentication, Param2)+D(Param1,Token)+D (Param2,Param1);

D(Authentication, Token)+D(Param1,Param1)+D (Param2,Param2); and

. . .

for all the permutations available (6 in this example). The final result in this case is D(Authentication, Token)+D (Param1,Param1)+(Param2,Param2)=11+0+0. The processor 14 may add the name distance: 11+Distance(Name getArtefact, Name getArtefact)=11+0=11; and may add the distance related to the returned type: 11+Distance (Artefact, Artefact)=11+0=11. The final result is Distance (Method getArtefact(V1)/Method getArtefact(V2))=11.

As a result the identification system may construct the ordered list of best match with length for the method getArtefact(V1) which is: (1) getArtefact(V2) with a length of 11; and (2) Authenticate with a length of 19.

In terms of best match for getArtefact(V1) the invention will propose to the end user the method getArtefact(V2). The same principles are used when the WSDL version 1 and version 2 contains more methods, with more or less parameters. The results of the process executed by the processor 14 will be, for each method in version 1, a list of best matches discovered from version 2.

What is claimed is:

1. A computer-implemented method for comparing descriptions of a web service, the method comprising:
   computing a distance between each type of parameter in a first description of a web service and each type of parameter in a second description of the web service, wherein the first description comprises a first set of methods, the second description comprises a second set of methods, and each method comprises one or more parameters;
   selecting two or more pairs of methods, wherein each pair of methods in the two or more pairs of methods comprises a respective first method selected from the first description of the web service and a respective second method selected from the second description of the web service;
   for each of the two or more pairs of methods, calculating, by a computer processor, a respective distance between the respective first method and the respective second method in the pair of methods, wherein the calculating comprises:
      determining a respective input-parameter distance by comparing the type of input parameters of the first set of methods in the first description of the web service and the second set of methods in the second description of the web service, based on the computed distances between types of parameters;
      determining a respective name distance between a string representing a name of the respective first method and a string representing a name of the respective second method in the pair of methods by generating a vector representation of the respective distance and the name distance between the string representing the name of the respective first method and the string of the name representing the respective second method in the pair of methods; and
      wherein the respective distance between the respective first method and the respective second method in the pair of methods is a distance sum comprising the input-parameter distance and the name distance; and
   outputting, for each method in the first description of the web service, a corresponding method in the second description having a lowest calculated respective distance among those paired with the method in the first description.

2. The computer-implemented method according to claim 1, wherein, for each of the two or more pairs of methods, the calculating the respective distance further comprises:
   determining a return-parameter distance between a type of parameter returned by the respective first method and a type of parameter returned by the respective second method in the pair of methods;
   wherein the respective distance between the respective first method and the respective second method in the pair of methods is the distance sum further comprising the name distance.

3. The computer-implemented method according to claim 2, wherein the determining the return-parameter distance between the type of parameter returned by the respective first method and the type of parameter returned by the respective second method in the pair of methods comprises generating a vector representation of the respective distance and the return-parameter distance between the type of parameter returned by the respective first method and the type of parameter returned by the respective second method in the pair of methods.

4. The computer-implemented method according to claim 1, wherein, for each of the two or more pairs of methods, the calculating the respective distance comprises selecting the minimum value generated from a set of distance measurements that include all combinations of the input parameters in the respective first method and the respective second method.

5. The computer-implemented method according to claim 1, wherein outputting, for each method in the first description of the web service, the corresponding method in the second description comprises outputting, for each method in the first description of the web service, an ordered list of methods in the second description with the lowest calculated respective distances.

6. A system for comparing descriptions of a web service, the system comprising:
   a memory having computer-readable instructions; and
   one or more processors for executing the computer-readable instructions, the computer-readable instructions comprising:
      computing a distance between each type of parameter in a first description of a web service and each type of parameter in a second description of the web service, wherein the first description comprises a first set of methods, the second description comprises a second set of methods, and each method comprises one or more parameters;
      selecting two or more pairs of methods, wherein each pair of methods in the two or more pairs of methods comprises a respective first method selected from the first description of the web service and a respective second method selected from the second description of the web service;
      for each of the two or more pairs of methods, calculating, by a computer processor, a respective distance between the respective first method and the respective second method in the pair of methods, wherein the calculating comprises:
         determining a respective input-parameter distance by comparing the type of input parameters of the first set of methods in the first description of the web service and the second set of methods in the second description of the web service, based on the computed distances between types of parameters; and
         determining a respective name distance between a string representing a name of the respective first method and a string representing a name of the respective second method in the pair of methods by generating a vector representation of the respective distance and the name distance between the string representing the name of the respective first method and the string of the name representing the respective second method in the pair of methods;

wherein the respective distance between the respective first method and the respective second method in the pair of methods is a distance sum comprising the input-parameter distance and the name distance; and outputting, for each method in the first description of the web service, a corresponding method in the second description having a lowest calculated respective distance among those paired with the method in the first description.

7. The system according to claim 6, wherein, for each of the two or more pairs of methods, the calculating the respective distance further comprises:

determining a return-parameter distance between a type of parameter returned by the respective first method and a type of parameter returned by the respective second method in the pair of methods;

wherein the respective distance between the respective first method and the respective second method in the pair of methods is the distance sum further comprising the name distance.

8. The system according to claim 7, wherein the determining the return-parameter distance between the type of parameter returned by the respective first method and the type of parameter returned by the respective second method in the pair of methods comprises generating a vector representation of the respective distance and the return-parameter distance between the type of parameter returned by the respective first method and the type of parameter returned by the respective second method in the pair of methods.

9. The system according to claim 6, wherein, for each of the two or more pairs of methods, the calculating the respective distance comprises selecting the minimum value generated from a set of distance measurements that include all combinations of the input parameters in the respective first method and the respective second method.

10. The system according to claim 6, wherein outputting, for each method in the first description of the web service, the corresponding method in the second description comprises outputting, for each method in the first description of the web service, an ordered list of methods in the second description with the lowest calculated respective distances.

11. A computer-program product for for comparing descriptions of a web service, the computer-program product comprising a computer-readable storage medium having program instructions embodied therewith, the program instructions executable by a processor to cause the processor to perform a method comprising:

computing a distance between each type of parameter in a first description of a web service and each type of parameter in a second description of the web service, wherein the first description comprises a first set of methods, the second description comprises a second set of methods, and each method comprises one or more parameters;

selecting two or more pairs of methods, wherein each pair of methods in the two or more pairs of methods comprises a respective first method selected from the first description of the web service and a respective second method selected from the second description of the web service;

for each of the two or more pairs of methods, calculating, by a computer processor, a respective distance between the respective first method and the respective second method in the pair of methods, wherein the calculating comprises:

determining a respective input-parameter distance by comparing the type of input parameters of the first set of methods in the first description of the web service and the second set of methods in the second description of the web service, based on the computed distances between types of parameters;

determining a respective name distance between a string representing a name of the respective first method and a string representing a name of the respective second method in the pair of methods by generating a vector representation of the respective distance and the name distance between the string representing the name of the respective first method and the string of the name representing the respective second method in the pair of methods; and wherein the respective distance between the respective first method and the respective second method in the pair of methods is a distance sum comprising the input-parameter distance and the name distance; and outputting, for each method in the first description of the web service, a corresponding method in the second description having a lowest calculated respective distance among those paired with the method in the first description.

12. The computer-program product according to claim 11, wherein, for each of the two or more pairs of methods, the calculating the respective distance further comprises:

determining a return-parameter distance between a type of parameter returned by the respective first method and a type of parameter returned by the respective second method in the pair of methods;

wherein the respective distance between the respective first method and the respective second method in the pair of methods is the distance sum further comprising the name distance.

13. The computer-program product according to claim 12, wherein the determining the return-parameter distance between the type of parameter returned by the respective first method and the type of parameter returned by the respective second method in the pair of methods comprises generating a vector representation of the respective distance and the return-parameter distance between the type of parameter returned by the respective first method and the type of parameter returned by the respective second method in the pair of methods.

14. The computer-program product according to claim 11, wherein, for each of the two or more pairs of methods, the calculating the respective distance comprises selecting the minimum value generated from a set of distance measurements that include all combinations of the input parameters in the respective first method and the respective second method.

* * * * *